US012387060B2

(12) United States Patent
Pan et al.

(10) Patent No.: US 12,387,060 B2
(45) Date of Patent: Aug. 12, 2025

(54) LOCAL INPUT METHOD FOR REMOTE DESKTOPS

(71) Applicant: Omnissa, LLC, Mountain View, CA (US)

(72) Inventors: Arong Pan, Beijing (CN); ZhangLin Zhou, Beijing (CN); Yang Yu, Beijing (CN); Lei Wang, Beijing (CN); Bin Bai, Beijing (CN); YiQun Yun, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 290 days.

(21) Appl. No.: 17/677,518

(22) Filed: Feb. 22, 2022

(65) Prior Publication Data

US 2023/0229869 A1  Jul. 20, 2023

(30) Foreign Application Priority Data

Jan. 20, 2022 (WO) ................ PCT/CN2022/072960

(51) Int. Cl.
*G06F 40/58* (2020.01)
*G06F 9/451* (2018.01)
*G06F 40/166* (2020.01)
*G06F 3/04842* (2022.01)

(52) U.S. Cl.
CPC ............. *G06F 40/58* (2020.01); *G06F 9/452* (2018.02); *G06F 40/166* (2020.01); *G06F 3/04842* (2013.01)

(58) Field of Classification Search
CPC ...................................................... G06F 40/58
See application file for complete search history.

(56) References Cited

U.S. PATENT DOCUMENTS

| 9,405,791 | B2 * | 8/2016 | Fierro et al. | G06F 17/30377 |
| 11,068,715 | B1 * | 7/2021 | Zuo et al. | G10L 15/22 |
| 2009/0210214 | A1 * | 8/2009 | Qian et al. | G06F 17/28 |
| 2011/0153853 | A1 * | 6/2011 | London et al. | G06F 15/16 |
| 2015/0220541 | A1 * | 8/2015 | Zhang | G06F 17/26 |
| 2016/0378782 | A1 * | 12/2016 | Jiang et al. | G06F 17/30165 |
| 2022/0067991 | A1 * | 3/2022 | Raviv et al. | G06T 11/60 |
| 2022/0300251 | A1 * | 9/2022 | Wang et al. | G06F 3/16 |

* cited by examiner

*Primary Examiner* — James J Debrow
(74) *Attorney, Agent, or Firm* — Kim & Stewart LLP

(57) ABSTRACT

A method of generating text in a first language for incorporation into a remote desktop image to be displayed at a client device, based on inputs made at the client device in a second language different from the first language includes the steps of: transmitting the inputs at the client device in the second language to a remote device that is generating the remote desktop image; generating candidate text in the first language at the client device based on the inputs made at the client device in the second language; upon selection of the candidate text at the client device, transmitting the candidate text to the remote device for incorporation of the candidate text into an updated remote desktop image; and upon receipt of the updated remote desktop image, displaying the updated remote desktop image at the client device.

20 Claims, 7 Drawing Sheets

Time 1: User launches remote desktop client

| Activate Command ID 200 | Language ID 202 | Keyboard Layout Name 204 | Open Status 206 | Conversion Mode 208 | Sentence Mode 210 |

Time 2: User types to input original text
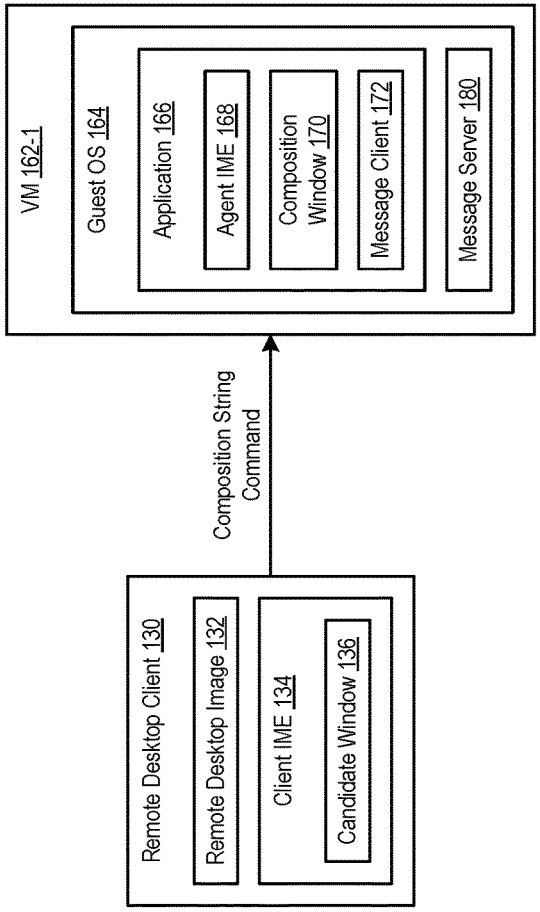
Figure 2C
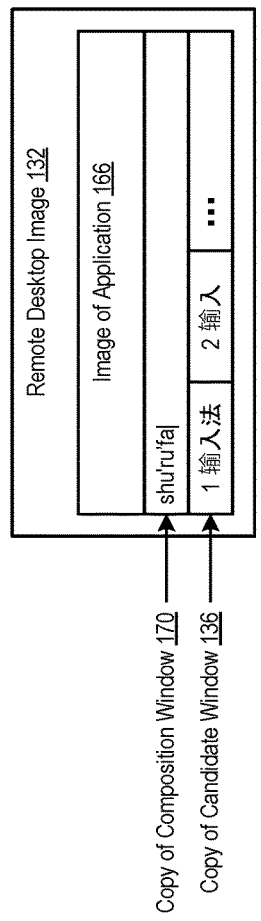
Figure 2D
Figure 2E

Time 3: User selects candidate from candidate window

| Caret Position Command ID 300 | Left Position 302 | Top Position 304 | Right Position 306 | Bottom Position 308 |

Figure 3A

| Conversion Mode Command ID 310 | Open Status 312 | Conversion Mode 314 | Sentence Mode 316 |

Figure 3B

| Unregister Command ID 320 | Language ID 322 |

Figure 3C

| Process Information Command ID 330 | Language ID 332 | Process Name Size 334 | Process Name 336 |

Figure 3D

| Composition Complete/ Abort Command ID 340 |

Figure 3E

LOCAL INPUT METHOD FOR REMOTE DESKTOPS

CROSS-REFERENCE

This application is based upon and claims the benefit of priority from International Patent Application No. PCT/CN2022/072960, filed on Jan. 20, 2022, the entire contents of which are incorporated herein by reference.

BACKGROUND

An input method editor (IME) is a software that enables a user to input text in a language that cannot be easily represented on a standard keyboard. For example, an IME may enable a user of a Latin keyboard to input Chinese characters into a text editor. First, the user types to input text into an application, and the application displays the inputted text in a "composition window." For example, the user of the Latin keyboard may Romanize a word of another language to input into the application. As the user types, the IME generates "candidates," which are suggestions for characters of another language into which the inputted text is to be converted. The IME then displays the candidates to the user in a "candidate window," which is superimposed over a portion of the composition window. Upon the user selecting a candidate, the IME replaces the text in the composition window with the selected candidate.

Usage of IMEs becomes problematic in the remote desktop context, wherein a user's desktop environment runs remotely on a host server while being displayed on a separate client computing device. The user may be uncomfortable with a default IME that is installed on the host server. Furthermore, an administrator of the host server may prevent the user from installing the user's preferred IME. A solution is desired that allows a user to use a preferred IME in the remote desktop context when installation on the host server is prohibited.

SUMMARY

Accordingly, one or more embodiments provide a method of generating text in a first language for incorporation into a remote desktop image to be displayed at a client device, based on inputs made at the client device in a second language different from the first language. The method includes the steps of: transmitting the inputs at the client device in the second language to a remote device that is generating the remote desktop image; generating candidate text in the first language at the client device based on the inputs made at the client device in the second language; upon selection of the candidate text at the client device, transmitting the candidate text to the remote device for incorporation of the candidate text into an updated remote desktop image; and upon receipt of the updated remote desktop image, displaying the updated remote desktop image at the client device.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2C is a system diagram illustrating the inputting of text into an application via a keyboard.

FIG. 2D is a block diagram illustrating the components of a composition string command.

FIG. 2E is a system diagram illustrating an example of a remote desktop image including copies of composition and candidate windows after a user inputs text into the application via the keyboard.

FIGS. 3A-3E are block diagrams illustrating the components of additional commands transmitted between a client IME and the agent IME.

DETAILED DESCRIPTION

Techniques for generating text, within the remote desktop context for a client computing device, in a language that cannot be easily represented on a standard keyboard, are described. According to embodiments, an agent IME component on a remote computing device generates a composition window of an application. The remote computing device transmits, to the client computing device, a remote desktop image that includes the composition window. Through the composition window, the user sees text inputted into the application via the user's keyboard, such text referred to herein as "original text." Furthermore, as the user types, a client IME component on the client computing device provides a user interface (UI) of a third-party IME and generates a candidate window. The candidate window includes candidates in a different language, also referred to herein as a "conversion language." The agent and client IME components are also referred to collectively herein as "the IME."

After the generation of the candidate window, the client computing device superimposes the candidate window over the image of the composition window received from the remote computing device. Upon the user selecting a candidate, the client computing device transmits the selected candidate to the remote computing device. The remote computing device then replaces original text of the composition window with the selected candidate and transmits an updated remote desktop image to the client computing device. The user then sees the selected candidate in the composition window.

Because the client IME component generates the candidate window on the client computing device, the user is able to use a UI that the user is comfortable with even if an administrator of the remote computing device prevents installation of the user's preferred IME thereon. Furthermore, because the agent IME component generates the composition window on the remote computing device, when the user selects a candidate, the agent IME component adds the candidate to the composition window with desired text attributes. For example, if the user is typing into a text editor with color, size, and boldness specified by the text editor, the agent IME component adds selected candidates to the composition window with such specified text attributes. These and further aspects of the invention are discussed below with respect so the drawings.

Figure 1:
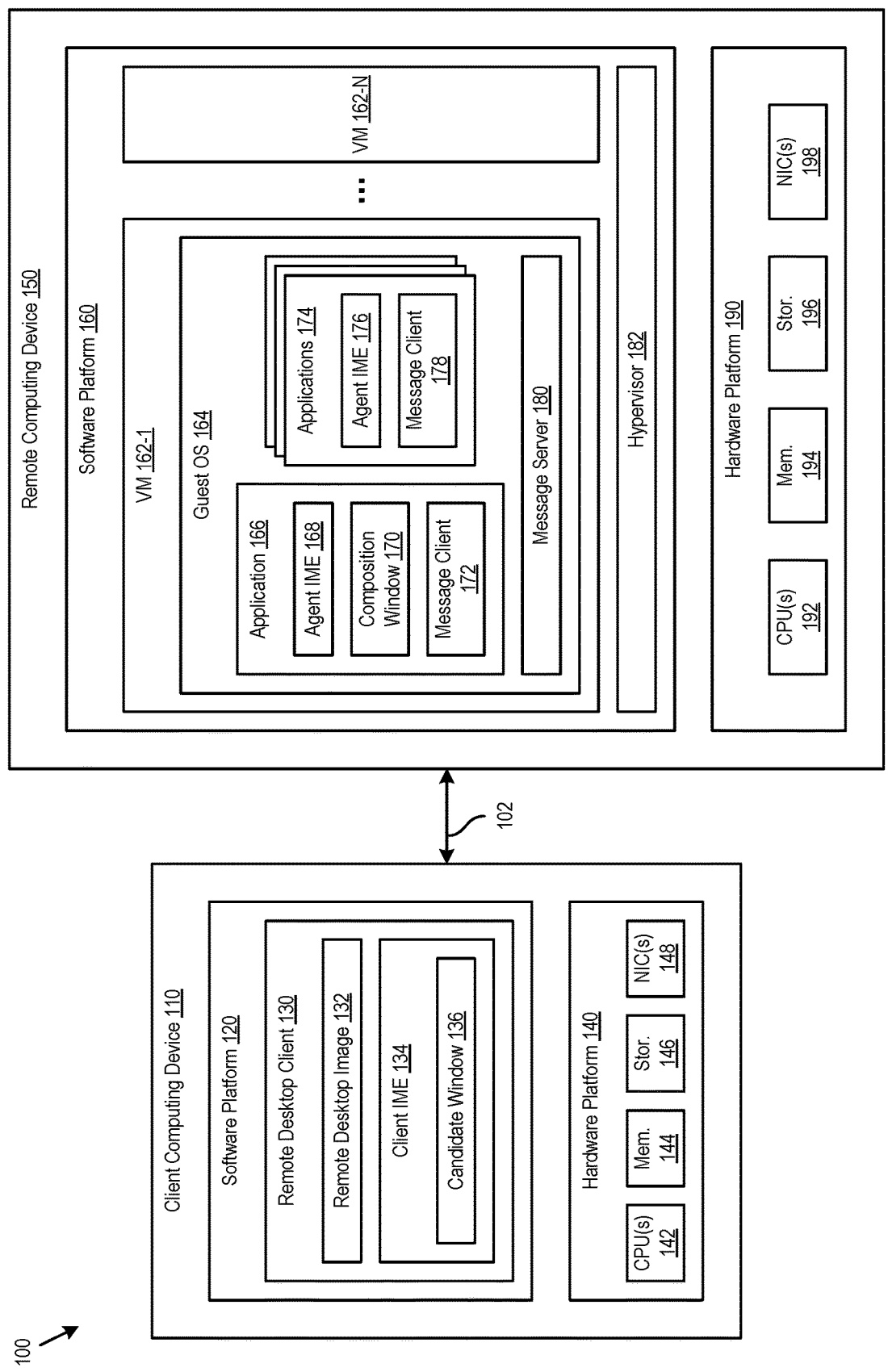
FIG. 1 is a block diagram of a virtualized computer system in which embodiments may be implemented.

FIG. 1 is a block diagram of a virtualized computer system 100 in which embodiments may be implemented. Virtualized computer system 100 includes a client computing device 110 and a remote computing device 150. Client computing device 110 is a computing device of a user such as a desktop computer or laptop on which the user's desktop environment is displayed. Remote computing device 150 is, e.g., a server on which the user's desktop environment runs.

Client computing device 110 and remote computing device 150 are constructed on server grade hardware platforms 140 and 190 such as x86 architecture platforms. Hardware platforms 140 and 190 each include conventional components of a computing device, such as one or more central processing units (CPUs) 142 or 192, system memory 144 or 194 such as random-access memory (RAM), local storage 146 or 196 such as one or more hard disk drives (HDDs) or solid-state drives (SSDs), and one or more network interface cards (NICs) 148 or 198. CPU(s) 142 and 192 are configured to execute instructions such as executable instructions that perform operations described herein, which may be stored in system memory 144 and 194, respectively. Local storage 146 and 196 may also optionally be aggregated and provisioned as virtual storage area networks (vSANs). NIC(s) 148 and 198 enable client computing device 110 and remote computing device 150 to communicate with each other over a physical network 102 such as the Internet.

Hardware platform 190 supports a software platform 160. Software platform 160 includes a hypervisor 182, which is a virtualization software layer that abstracts hardware resources of hardware platform 190 for concurrently running VMs 162. One example of hypervisor 182 that may be used is a VMware ESX® hypervisor by VMware, Inc. Although the disclosure is described with reference to VMs, the teachings herein also apply to nonvirtualized applications and to other types of virtual computing instances such as containers, Docker® containers, data compute nodes, isolated user space instances, and the like for which users may log in remotely and use an IME for generating text of a particular language.

VM 162-1 includes a guest operating system (OS) 164, which runs the user's desktop environment, remote computing device 150 transmitting an image thereof to a remote desktop client 130 of client computing device 110. On guest OS 164, a group of applications, including application 166 and applications 174, execute. Application 166 represents an application that has been launched on guest OS 164, and the UI of which is displayed through a window that is in the foreground, which is hereinafter referred to as a "focused" window. Applications 174 represent additional applications that have been launched on guest OS 164, but the windows for displaying their UIs are either in the background or closed.

Application 166 and applications 174 each include an agent IME 168 or 176 and a message client 172 or 178. Agent IME 168 or 176 generates a composition window 170 for an application corresponding to a focused window, which is application 166 in FIG. 1. Composition window 170 displays text, referred to herein as "composition text," which may include original text that the user has typed into an application and/or candidates the user has selected. Message clients 172 and 178 are intermediaries between a message server 180 and respective agent IMEs 168 and 176. Message server 180 is an intermediary between hypervisor 182 and agent IMEs 168 and 176. Via message clients 172 and 178 and message server 180, a client IME 134 and agent IMEs 168 and 176 exchange messages to synthronize a candidate window 136 and composition window 170, as discussed further below.

Hardware platform 140 supports a software platform 120, which includes remote desktop client 130. Remote desktop client 130 displays a remote desktop image 132, which is an image of the user desktop environment running on remote computing device 150. Remote desktop client 130 includes client IME 134, which generates candidate window 136 for the application corresponding to the focused window of guest OS 164. Candidate window 136 displays candidates, i.e., suggestions for characters of a conversion language to convert original text into. Specifically, remote desktop client 130 superimposes candidate window 136 over remote desktop image 132 such that the user can see candidates as the user types.

As previously mentioned, client IME 134 and agent IMEs 168 and 176 exchange messages to synthronize candidate window 136 and composition window 170. For example, when the user selects a candidate for application 166, client IME 134 transmits a message to hypervisor 182 including the selected candidate, hypervisor 182 forwards the message to message server 180, and message server 180 forwards the message to message client 172 to provide to agent IME 168. Such a message is discussed further below in conjunction with FIGS. 2F-2H. On the other hand, for example, when the user moves a caret in composition window 170, agent IME 168 instructs message client 172 to transmit a message indicating a new caret position, message client 172 transmits the message to message server 180, message server 180 forwards the message to hypervisor 182, and hypervisor 182 forwards the message to client IME 134. Such a message is discussed further below in conjunction with FIG. 3A.

Figures 2A, 2B:
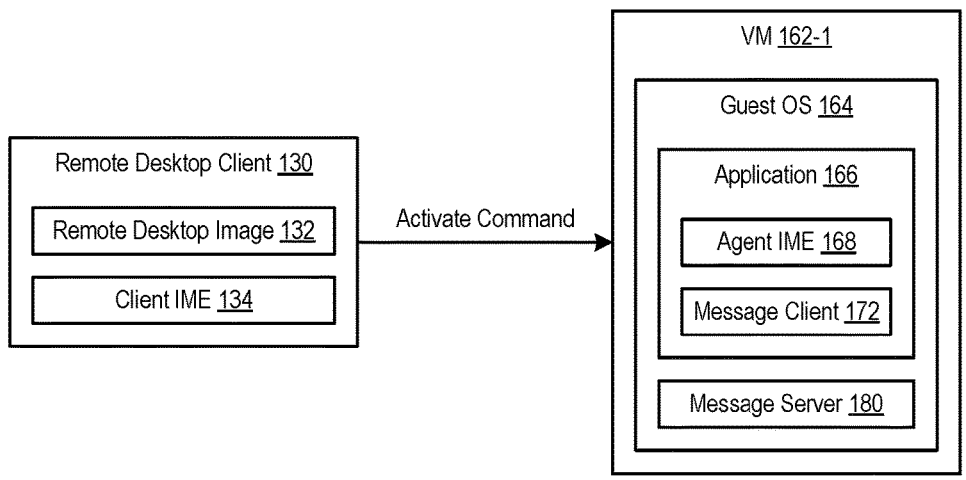
FIG. 2A is a system diagram illustrating the activation of an agent IME on a remote computing device.
FIG. 2B is a block diagram illustrating the components of an activate command.

FIG. 2A is a system diagram illustrating the activation of agent IME 168 on remote computing device 150. At a time 1, the user launches remote desktop client 130 and application 166 via remote desktop client 130, and client IME 134 transmits an "activate command" as a message via message sever 180 and message client 172. The activate command indicates that remote desktop client 130 is activating a third-party IME for inputting text of the conversion language into application 166. In response, guest OS 164 initializes agent IME 168 to match client IME 134, e.g., in terms of which conversion language original text is being converted into.

FIG. 2B is a block diagram illustrating the components of an activate command. The activate command includes an activate command ID 200, language ID 202, keyboard layout name 204, open status 206, conversion mode 208, and sentence mode 210.

Activate command ID 200 is an identifier indicating that the command is an activate command. Language ID 202 is an identifier indicating the conversion language. Keyboard layout name 204 is a name of the layout of the user's keyboard, e.g., United States layout. Open status 206 indicates whether the IME is initially enabled or disabled for application 166. Conversion mode 208 specifies a mode for the conversion language. For example, if language ID 202 identifies Japanese, then conversion mode 208 may be, e.g., Katakana mode. Sentence mode 210 specifies whether the user wants the IME to provide suggestions for completing sentences as the user is typing, i.e., to guess the intent of the user based on partially completed sentences. Furthermore, although not illustrated in FIG. 2B, the activate command may further include an "IME type" component for further narrowing the IME designation. For example, different IME types respond differently to the user pressing arrow keys.

FIG. 2C is a system diagram illustrating the inputting of original text into application 166. At a time 2, the user inputs text via the user's keyboard, and client IME 134 transmits a "composition string command" to agent IME 168 as a message via message sever 180 and message client 172. The composition string command includes the original text as a string-type variable and includes various information about the original text. Upon receiving the composition string command, the agent IMF adds the original text to composition window 170. Furthermore, based on the original text, client IME 134 generates candidates to include in candidate window 136.

FIG. 2D is a block diagram illustrating the components of a composition string command. The composition string command includes a composition string command ID 220, composition size 222, composition string 224, attributes size 226, attributes 228, clauses size 230, clauses 232, and cursor position 234.

Composition string command ID 220 is an identifier indicating that the command is a composition string command. Composition size 222 indicates a size of composition string 224, composition string 224 being a string storing the original text input by the user. Attributes size 226 indicates a size of attributes 228, attributes 228 describing a display of the original text. For example, attributes 228 may include underlining for the original text so that when the user sees updated composition window 170 in remote desktop image 132, the user sees that the original text has not yet been converted to a desired language. Clauses size 230 indicates a size of clauses 232, clauses 232 being used by certain IMEs for breaking up sufficiently long composition strings 224 for individual rendering of constituent parts. Cursor position 234 indicates a position within composition string 224 at which the user is currently editing. For example, cursor position 234 may be an index such as 0, 1, 2, etc. When agent IME 168 receives the composition string command, based on cursor position 234, agent IME 168 adds a cursor, e.g., a blinking vertical bar, indicating to the user where in composition string 224 the user is currently editing. It should be noted that in a situation in which composition string 224 is broken up into clauses 232, the position of the user's cursor is also used by client IME 134 to determine which of clauses 232 to generates candidate for.

FIG. 2E is a system diagram illustrating an example of remote desktop image 132 including copies of composition and candidate windows 170 and 136 after the user inputs original text into application 166. After the original text is added to composition window 170, remote desktop image 132 is transmitted to remote desktop client 130, and remote desktop client 130 superimposes the copy of candidate window 136 over the transmitted image. In the example of FIG. 2E, the original text includes "shu'ru'fa," and the vertical bar "|" indicates the current location of the cursor at which the user is inputting original text. Furthermore, candidates generated by client IME 134 in response to the original text include the Chinese characters "输入法," labeled as candidate "1," and "输入," labeled as candidate "2." For example, the user can select candidate 1 by pressing "1" on the keyboard or candidate 2 by pressing "2" on the keyboard.

Figure 2F:
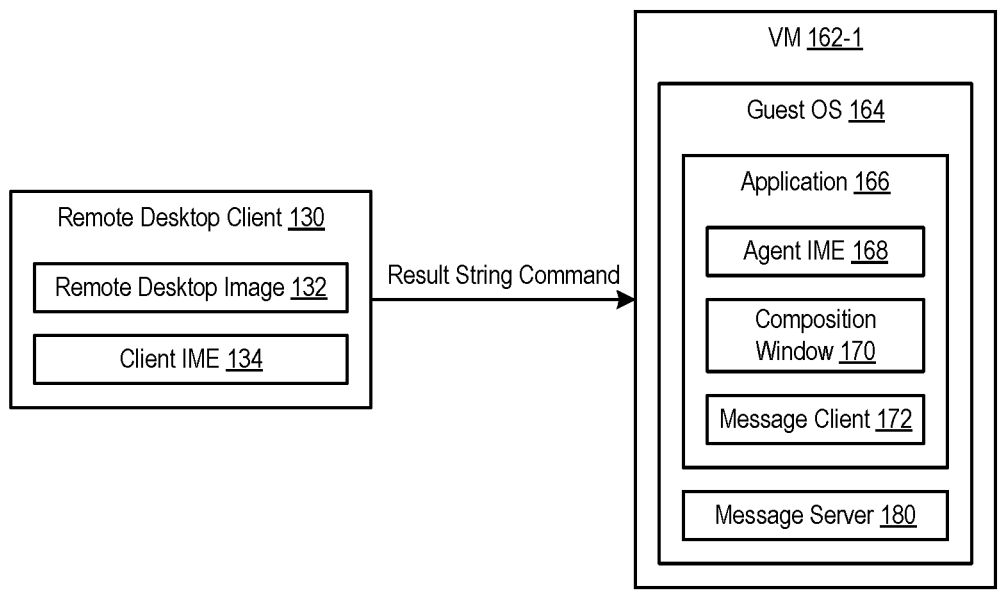
FIG. 2F is a system diagram illustrating the selection of a candidate from a candidate window.

FIG. 2F is a system diagram illustrating the selection of a candidate from candidate window 136. At a time 3, the user selects a candidate, and client 134 transmits a "result string command" to agent IME 168 as a message via message sever 180 and message client 172. The result string command includes the selected candidate as a string-type variable. In response, agent IME 168 replaces, in composition window 170, original text with the selected candidate. Furthermore, client IME 134 deletes candidate window 136.

Figure 2G:
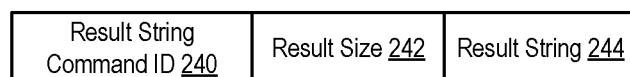
FIG. 2G is a block diagram illustrating the components of a result string command.

FIG. 2G is a block diagram illustrating the components of a result string command. The result string command includes a result string command ID 240, result size 242, and result string 244. Result string command ID 240 is an identifier indicating that the command is a result string command. Result size 242 indicates a size of result string 244, result string 244 being a string storing a candidate selected by the user.

Figure 2H:
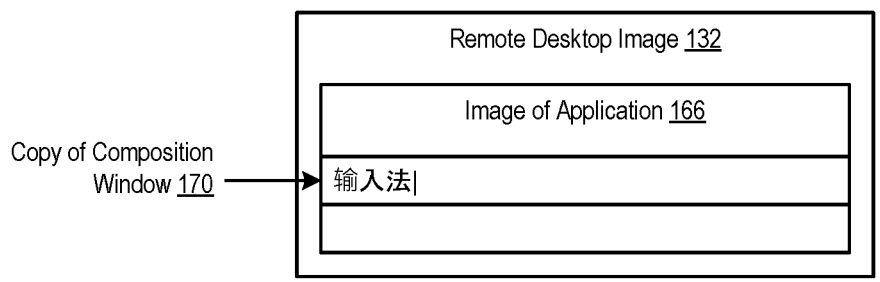
FIG. 2H is a system diagram illustrating an example of a remote desktop image including a copy of the composition window after the user selects the candidate.

FIG. 2H is a system diagram illustrating an example of remote desktop image 132 including a copy of composition window 170 after the user selects the candidate. After original text of composition window 170 is replaced by the selected candidate, an updated image is transmitted to remote desktop client 130 as remote desktop image 132. In the example of FIG. 2H, the selected candidate is "输入法," which has replaced the original text "shu'ru'fa."

FIGS. 3A-3E are block diagrams illustrating the components of additional commands transmitted between client IME 134 and agent IME 168. FIG. 3A is a block diagram illustrating the components of a "caret position command." Agent IME 168 transmits the caret position command to client IME 134 as a message when the user moves the caret in composition window 170, e.g., by pressing an arrow key. The caret is a rectangle located at the position of composition window 170 at which the user is currently inputting text. In response to receiving the caret position command, client IME 134 updates a position of candidate window 136 with respect to remote desktop image 132.

The caret position command includes a caret position command ID 300, left position 302, top position 304 right position 306, and bottom position 308. Caret position command ID 300 is an identifier indicating that the command is a caret position command. Left position 302 indicates a screen position of composition window 170 at which the left border of the caret is located. For example, left position 302 may be an (x,y) coordinate. Similarly, top position 304, right position 306, and bottom position 308 indicate positions of composition window 170 at which the top, right, and bottom positions of the caret are located.

FIG. 3B is a block diagram illustrating the components of a "conversion mode command." Client IME 134 transmits the conversion mode command to agent IME 168, or vice versa, as a message, when a setting of the IME is changed. In response, guest OS 164 updates agent IME 168 to match client IME 134, or, if agent IME 168 transmits the conversion mode command to client IME 134 remote desktop client 130 updates client IME 134 to match agent IME 168.

The conversion mode command includes a conversion mode command ID 310, open status 312, conversion mode 314, and sentence mode 316. Conversion mode command ID 310 is an identifier indicating that the command is a conversion mode command. Open status 312, conversion mode 314, and sentence mode 316 are similar to open status 206, conversion mode 208, and sentence mode 210, described above in conjunction with the activate command in FIG. 2B. However, open status 312, conversion mode 314, and sentence mode 316 include an update to one of such settings instead of an initialization.

FIG. 3C is a block diagram illustrating the components of an "unregister command." Client IME 134 transmits the unregister command to agent IME 168 as a message when the user logs out of remote desktop client 130. In response, guest OS 164 uninstalls agent IME 168 from application 166. As such, if the user accesses guest OS 164 in a different manner than via remote desktop client 130, agent IME 168 is no longer included. On the other hand, if the user again accesses guest OS 164 using remote desktop client 130, remote desktop client 130 transmits an activate command to guest OS 164, as discussed above in conjunction with FIGS. 2A-2B.

The unregister command includes an unregister command ID 320 and language ID 322. Unregister command ID 320 is an identifier indicating that the command is an unregister command. Language ID 322 is similar to language ID 202, described above in conjunction with the activate command in FIG. 2B. However, in the case of the unregister command, language ID 322 is used for designating agent IME 168 for uninstallation.

FIG. 3D is a block diagram illustrating the components of a "process information command." Agent IME 168 transmits the process information command to client IME 134 as a message when the focused window changes from that of application 166 to that of another process such as one of applications 174. In response, remote desktop client 130 determines whether to disable client IME 134 for the process corresponding to the newly focused window or, if client IME 134 is currently disabled, whether to enable client IME 134. For example, if the process corresponding to the newly focused window does not include a UI for text input, then remote desktop client 130 disables client IME 134 and deletes candidate window 136.

The process information command includes a process information command ID 330, language ID 332, process name size 334, and process name 336. Process information command ID 330 is an identifier indicating that the command is a process information command. Language ID 332 is similar to language ID 202, described above in conjunction with the activate command in FIG. 2B. However, in the case of the process information command, language ID 332 is used for indicating which language agent IME 1.68 is currently activated for. For example, if agent IME 168 is activated for a different language than that of client IME 134, client IME 134 transmits another activate command to agent IME 168, and agent IME 168 is initialized to match language ID 202 of the activate command. Process name size 334 indicates a size of process name 336, process name 336 being a name of the process corresponding to the newly focused window. For example, remote desktop client 130 may include a list of processes that have no UIs for text input. Remote desktop client 130 may compare process name 336 to such a list to determine if the IME should be disabled.

FIG. 3E is a block diagram illustrating a "composition complete abort command." Agent IME 168 transmits the composition complete/abort command to client IME 134 as a message to indicate the end of the execution of composition window 170. For example, composition window 170 may be aborted in response to a mouse event such as the user closing application 166. In response, remote desktop client 130 closes client IME 134 and deletes candidate window 136. The composition complete/abort command only includes a composition complete/abort command ID 340, which is an identifier indicating that the command is a composition complete/abort command.

Figure 4:
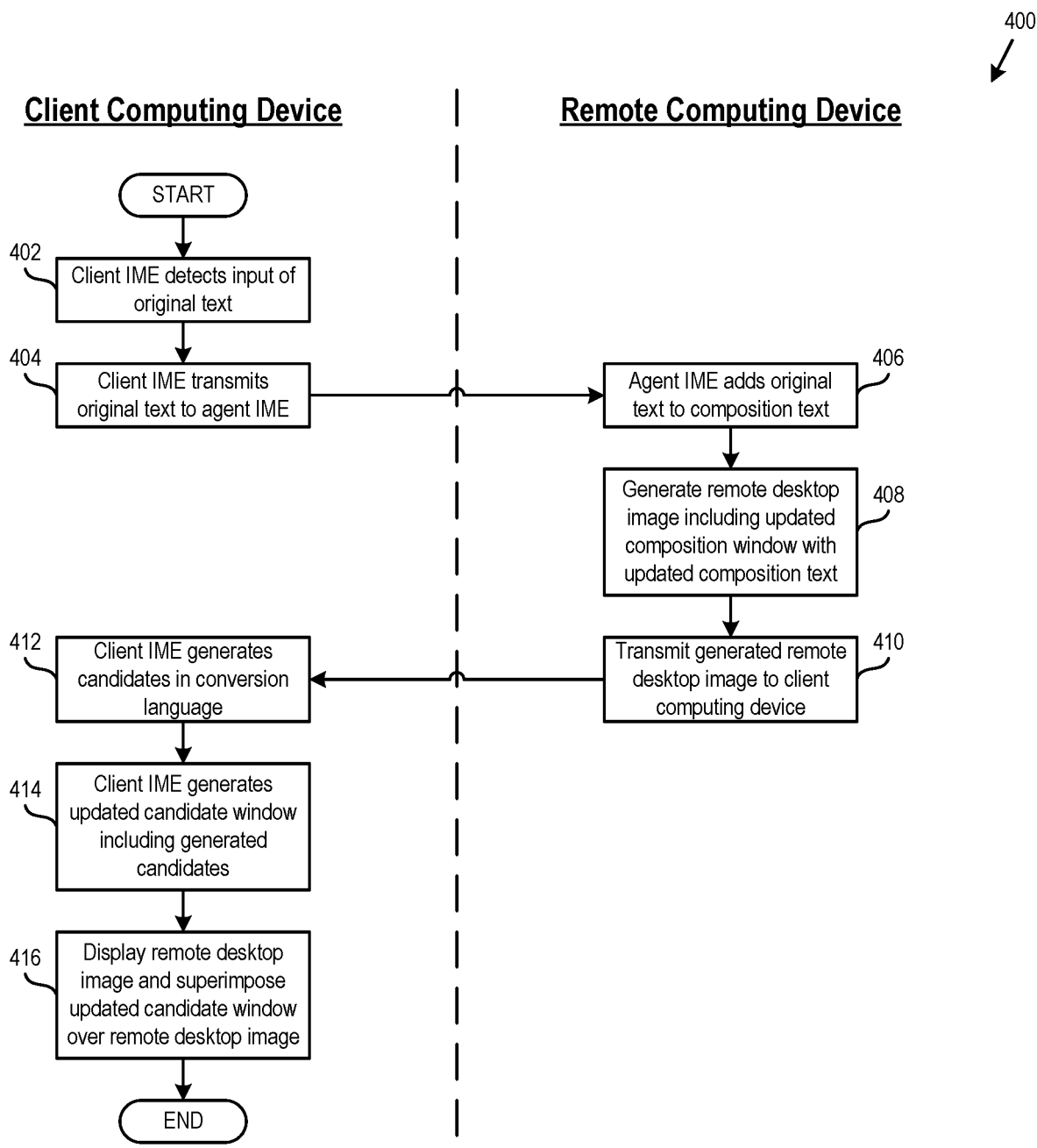
FIG. 4 is a flow diagram of steps carried out by the client IME on a remote desktop client and the agent IME on the remote computing device to carry out a method of adding text to a composition window and generating a candidate window to superimpose over a remote desktop image, according to an embodiment.

FIG. 4 is a flow diagram of steps carried out by client IME 134 on remote desktop client 130 and agent IME 168 on remote computing device 150 to carry out a method 400 of adding original text to composition window 170 and generating candidate window 136 to superimpose over remote desktop image 132, according to an embodiment. For explanatory purposes, method 400 is discussed with reference to application 166 of FIG. 1, application 166 corresponding to the currently focused window of guest OS 164.

At step 402, client IME 134 detects input of original text from the user's keyboard. At step 404, client IME 134 transmits the original text to agent IME 168 as a composition string command, Specifically, client IME 134 transmits composition string command ID 220, a size of the original text as composition size 222, and the original text as composition string 224. Additionally, client IME 134 may transmit attributes such as underlining for the original text as attributes 228, a size of any included attributes as attributes size 226, preferences for splitting original text into clauses as clauses 232, a size of such preferences as clauses size 230, and a position of the user's cursor as cursor position 234.

At step 406, agent IME 168 adds the original text to the composition text of application 166. At step 408, guest OS 164 generates a remote desktop image including composition window 170, composition window 170 including the added original text with any specified attributes 228. At step 410, remote computing device 150 transmits the generated remote desktop image to remote desktop client 130 as remote desktop image 132. It should be noted that the transmitted remote desktop image does not include candidate window 136, which is generated by client IME 134 and not by agent IME 168.

At step 412, client IME 134 generates candidates in the conversion language based on the original text detected at step 402. At step 414, client IME 134 generates candidate window 136 including the candidates generated at step 412. At step 416, remote desktop client 130 displays remote desktop image 132 and superimposes candidate window 136 over remote desktop image 132. After step 416, method 400 ends, and the user sees, in remote desktop image 132, the generated candidates along with the original text.

Figure 5:
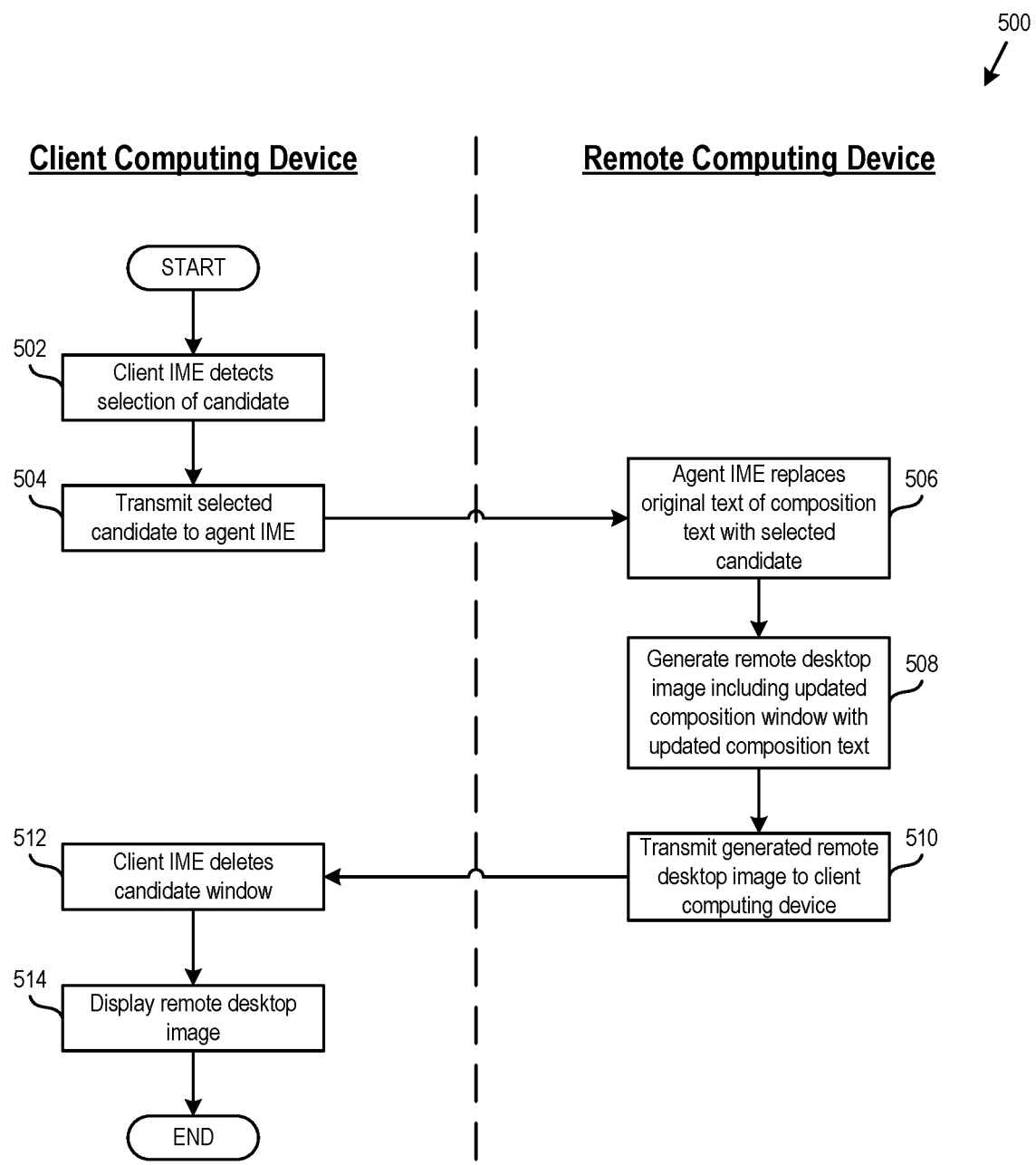
FIG. 5 is a flow diagram of steps carried out by the client IME on the remote desktop client and the agent IME on the remote computing device to carry out a method of adding a selected candidate to a composition window, according to an embodiment.

FIG. 5 is a flow diagram of steps carried out by client IME 134 on remote desktop client 130 and agent IME 168 on remote computing device 150 to carry out a method 500 of adding a selected candidate to composition window 170, according to an embodiment. For explanatory purposes, method 500 is discussed with reference to application 166 of FIG. 1, application 166 corresponding to the currently focused window of guest OS 164. At step 502, client IME 134 detects a selection of a candidate from candidate window 136. For example, the user may have typed a number corresponding to the selected candidate.

At step 504, remote desktop client 130 transmits the selected candidate to agent IME 168 as a result string command. Specifically, client IME 134 transmits result string command ID 240, a size of the selected candidate as result size 242, and the selected candidate as result string 244. At step 506 agent IME 168 replaces original text of composition window 170 with the selected candidate. Furthermore, agent IME 168 adds the selected candidate to composition window 170 with desired text attributes. For example, if the user is typing with color, size, and boldness specified by application 166, agent IME 168 adds the selected candidate to composition window 170 with such specified text attributes.

At step 508, guest OS 164 generates a remote desktop image including composition window 170, composition window 170 including the selected candidate. At step 510, remote computing device 150 transmits the generated remote desktop image to remote desktop client 130 as remote desktop image 132. It should be noted that the transmitted remote desktop image does not include candidate window 136, which is generated by client IME 134 and not by agent IME 168. At step 512, client IME 134 deletes candidate window 170. At step 514, remote desktop client 130 displays remote desktop image 132. After step 514, method 500 ends, and the user sees the selected candidate in remote desktop image 132.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of generating text in a first language for incorporation into a remote desktop image to be displayed at a client device, the text being generated based on inputs made at the client device on a keyboard for a second language different from the first language, said method comprising:
   transmitting the inputs made at the client device to a remote device that is generating the remote desktop image;
   generating candidate text in the first language at the client device based on the inputs made at the client device;
   upon selection of the candidate text at the client device, transmitting the candidate text to the remote device for incorporation of the candidate text into an updated remote desktop image; and
   upon receipt of the updated remote desktop image, displaying the updated remote desktop image at the client device.

2. The method of claim 1, further comprising:
   before the selection of the candidate text at the client device, superimposing, over an original remote desktop image, the candidate text.

3. The method of claim 2, wherein the candidate text is superimposed over the original remote desktop image based on position information received from the remote device.

4. The method of claim 1, wherein the remote device includes a virtual machine (VM), the inputs made at the client device and the candidate text are transmitted to the VM, and the updated remote desktop image is received from the VM.

5. The method of claim 1, further comprising:
   transmitting, to the remote device, an identifier of the first language and a name of a layout of the keyboard.

6. The method of claim 1, further comprising:
   transmitting, to the remote device, attributes describing a display on the updated remote desktop image received from the VM for the inputs made at the client device.

7. The method of claim 1, further comprising:
after displaying the updated remote desktop image at the client device, receiving a name of a process of the remote device, wherein a user interface (UI) of the process is displayed on a focused window of the remote device; and
based on the name of the process, deleting the candidate text.

8. A non-transitory computer readable medium comprising instructions that are executable in a computer system, wherein the instructions when executed cause the computer system to carry out a method of generating text in a first language for incorporation into a remote desktop image to be displayed at a client device, the text being generated based on inputs made at the client device on a keyboard for a second language different from the first language, the method comprising:
transmitting the inputs made at the client device to a remote device that is generating the remote desktop image;
generating candidate text in the first language at the client device based on the inputs made at the client device;
upon selection of the candidate text at the client device, transmitting the candidate text to the remote device for incorporation of the candidate text into an updated remote desktop image; and
upon receipt of the updated remote desktop image, displaying the updated remote desktop image at the client device.

9. The non-transitory computer readable medium of claim 8, the method further comprising:
before the selection of the candidate text at the client device, superimposing, over an original remote desktop image, the candidate text.

10. The non-transitory computer readable medium of claim 9, wherein the candidate text is superimposed over the original remote desktop image based on position information received from the remote device.

11. The non-transitory computer readable medium of claim 8, wherein the remote device includes a virtual machine (VM), the inputs made at the client device and the candidate text are transmitted to the VM, and the updated remote desktop image is received from the VM.

12. The non-transitory computer readable medium of claim 8, the method further comprising:
transmitting, to the remote device, an identifier of the first language and a name of a layout of the keyboard.

13. The non-transitory computer readable medium of claim 8, the method further comprising:
transmitting, to the remote device, attributes describing a display on the updated remote desktop image received from the VM for the inputs made at the client device.

14. The non-transitory computer readable medium of claim 8, the method further comprising:
after displaying the updated remote desktop image at the client device, receiving a name of a process of the remote device, wherein a user interface (UI) of the process is displayed on a focused window of the remote device; and
based on the name of the process, deleting the candidate text.

15. A computer system comprising:
a client device configured to execute instructions to generate text in a first language for incorporation into a remote desktop image generated by a remote device, the text being generated based on inputs made at the client device on a keyboard for a second language different from the first language, wherein the instructions cause the client device to carry out a method comprising:
transmitting the inputs made at the client device to the remote device;
generating candidate text in the first language based on the inputs made at the client device;
upon selection of the candidate text at the client device, transmitting the candidate text to the remote device for incorporation of the candidate text into an updated remote desktop image; and
upon receipt of the updated remote desktop image, displaying the updated remote desktop image.

16. The computer system of claim 15, the method further comprising:
before the selection of the candidate text at the client device, superimposing, over an original remote desktop image, the candidate text.

17. The computer system of claim 16, wherein the client device superimposes the candidate text over the original remote desktop image based on position information received from the remote device.

18. The computer system of claim 15, wherein the remote device includes a virtual machine (VM), the client device transmits the inputs made at the client device and the candidate text to the VM, and the client device receives the updated remote desktop image from the VM.

19. The computer system of claim 15, the method further comprising:
transmitting, to the remote device, an identifier of the first language and a name of a layout of the keyboard.

20. The computer system of claim 15, the method further comprising:
transmitting, to the remote device, attributes describing a display on the updated remote desktop image received from the VM for the inputs made at the client device.

* * * * *